United States Patent Office 3,600,290
Patented Aug. 17, 1971

3,600,290
FURAN-STABILIZED BETA-HYDROXY ESTER
COATING COMPOSITIONS
Chester W. Fitko, Chicago, Ill., assignor to Continental
Can Company, Inc., New York, N.Y.
No Drawing. Filed Jan. 15, 1970, Ser. No. 3,197
Int. Cl. C08d 1/00; C08f 1/16
U.S. Cl. 204—159.22
15 Claims

ABSTRACT OF THE DISCLOSURE

A composition stabilized to prevent gel formation but which remains susceptible to polymerization by ionizing radiation comprised of a mixture of a furan compound and an ethylenically unsaturated beta-hydroxy ester prepared from a polyepoxide and an alpha, beta-ethylenically unsaturated monocarboxylic acid such as acrylic or methacrylic acid. The beta-hydroxy ester/furan composition when applied to a substrate as a film and exposed to a source of ionizing radiation for a time sufficient to effect polymerization of the film, cures to a hard, infusible coating.

BACKGROUND OF THE INVENTION (1) Field of invention

This invention is related to polymerizable coating compositions and more particularly, to stabilized unsaturated beta-hydroxy ester compositions susceptible to polymerization using ionizing radiation.

(2) The prior art

In the manufacture of containers from metal sheet, a protective organic coating is applied to the side of the metal sheet which is to form the interior and/or exterior of the container. The materials which are employed for coating the metal sheet are generally heat-curable resinous materials which are applied in the form of a solution or a dispersion in a volatile organic solvent. The wet-coated metal surface is passed through an oven in which hot air is circulated to evaporate the solvent and to cure the coating material to the required hardness. As this form of coating application is relatively slow and presents an air pollution problem, the art is continually seeking more rapid methods of increasing the speed of coating application and avoiding the use of solvent-dispersed coating compositions.

Among the various methods which have been proposed to increase the speeds at which substrates such as metal sheet can be coated and to eliminate the use of solvent is to apply a layer of suitable thickness of an unsaturated monomer or mixture of monomers to the metal sheet surface whereupon the monomer layer is activated to react and form a cured coating by exposing the layer to a source of ionizing radiation. The activation is carried out at ambient temperatures, and since the action of the ionizing radiation is extremely rapid, the polymerizable layer can be polymerized in a continuous flow movement across the source of irradiation. Since no evaporation of solvent is required, hard, infusible polymeric coatings are obtained in relatively short periods of time.

Although a wide variety of unsaturated monomeric compounds have been proposed for use in forming polymeric coatings using ionizing radiation curing procedures, these compounds, when exposed to a source of ionizing radiation do not always form hard, adherent solvent-resistant coatings of the type which are required for coating articles.

In my U.S. application Ser. No. 794,374 filed Jan. 27, 1969 there is disclosed a method for coating a variety of substrates such as metal, paper, plastic and the like by applying to the substrate a thin film of an ethylenically unsaturated beta-hydroxy ester prepared by the reaction of a polyepoxide with an alpha, beta-ethylenically unsaturated monocarboxylic acid and then curing the film to a hard, infusible coating using a source of ionizing radiation.

The process disclosed in U.S. Ser. No. 794,374 eliminates the use of volatile organic solvents and high cost and time of the oven-baking cycle which is currently used for producing metal surface coatings.

On further experimentation with the coating method of U.S. Ser. No. 794,374, it was found that the beta-hydroxy unsaturated esters are very reactive monomeric materials and will polymerize at room temperature to form useless gels within a week's time when stored at room temperature. It was further determined that the useful life of the beta-hydroxy ester could be appreciably prolonged if stored under refrigerated temperatures. Due to the reactivity of these beta-hydroxy esters, commercial practice would require the storage and shipment of the esters under refrigerated conditions. The disadvantage and expense of refrigerated shipment plus the specialized handling procedures required for handling such highly reactive monomeric materials reduces the commercial applicability of the process disclosed in the aforementioned U.S. application Ser. No. 794,374.

In attempting to incorporate known stabilizing agents in the polymerizable beta-hydroxy ester compositions to stabilize the compositions it was found that in many cases the stabilizing agent diminished the sensitivity of the ester towards ionizing radiation, thereby reducing the effectiveness of the ester compound as a coating composition.

SUMMARY OF THE INVENTION

In accordance with the present invention there is provided a polymerizable beta-hydroxy ester composition which is stable to gel formation on prolonged exposure to ambient temperatures and which may be rapidly polymerized to infusible coatings by exposure to a source of ionizing radiation which is comprised of a beta-hydroxy ester prepared by the condensation of a polyepoxide having at least 2 epoxy groups per molecule and an alpha, beta-ethylenically unsaturated monocarboxylic acid having 3 to 7 carbon atoms and an effective stabilizing amount of a furan compound having the formula:

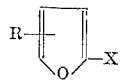

where R is an alkyl group having 1 to 6 carbon atoms and X is either H, $CH_2OH$, CHO, or $CH_2OCH_3$.

When furan compounds of the type disclosed are incorporated in beta-hydroxy esters in accordance with the practice of the present invention, the ability of the ester to withstand gel formation at ambient temperatures is extended from about a week's time to more than 100 days with no appreciable diminution of sensitivity to activation by ionizing radiation.

PREFERRED EMBODIMENTS

The polymerizable monomeric beta-hydroxy esters used to prepare the compositions of the present invention are prepared by reacting a polyepoxide with an alpha, beta-ethylenically unsaturated monocarboxylic acid with or without the presence of a non-reactive solvent, as for example, methyl ethyl ketone, benzene, toluene, xylene, for 2 to 20 hours or until the monocarboxylic acid is substantially consumed as determined by titration with base of samples drawn from the reaction mixture. Preferably, the reaction is carried out under reflux conditions, at either atmospheric or reduced pressure and under an inert atmosphere such as nitrogen. After the completion of this reaction, any solvent, inhibitor and unreacted acid is removed. The polymerizable polyepoxide/unsaturated acid ester reaction product is generally a pale to colorless, viscous liquid.

The proportions of reactants employed in preparing the ethylenically unsaturated beta-hydroxy ester products used to prepare the compositions of the present invention is not critical. In general, one molar equivalent of polyepoxide is utilized for one molar equivalent of ethylenically unsaturated monocarboxylic acid. However, the molar ratio of polyepoxide to acid may vary from 0.5:1 to 1.5:1.

The esterification reaction may occur without the aid of a catalyst, although catalysts such as tertiary amines, quaternary ammonium hydroxides, benzyl trimethyl ammonium hydroxide, N,N-dimethylaniline, N,N-benzyl dimethyl amine, potassium hydroxide, lithium hydroxide and the like may be added if desired to accelerate the reaction. The reaction of the polyepoxide with the ethylenically unsaturated monocarboxylic acid is generally conducted in the presence of a suitable inhibitor such as benzoquinone, nitrophenol, which contain non-reactive hydrogen. The presence of the inhibitor prevents gelation during the reaction.

Representative examples of alpha, beta-ethylenically unsaturated monocarboxylic acids having 3 to 7 carbon atoms which may be reacted with the polyepoxide to prepare the beta-hydroxy esters used in the composition of the present invention include acrylic acid, methacrylic acid, ethacrylic acid, isocrotonic acid, tiglic acid, angelic acid and senecioic acid. Of these acrylic and methacrylic are preferred.

The polyepoxides used to prepare the beta-hydroxy esters in the practice of the present invention comprise all those organic compounds containing at least two reactive epoxy groups, i.e.,

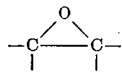

groups in their molecule. The polyepoxides may be saturated or unsaturated, aliphatic, cycloaliphatic, aromatic, or heterocyclic and may be substituted if desired with non-interfering substituents.

Among the epoxy resins which may be employed are complex polymeric reaction products of polyhydric mono and polynuclear phenols with polyfunctional halohydrins and/or glycerol dichlorohydrin. A large number of epoxy resins of this type are disclosed in the Greenlee patents U.S. Patents No. 2,585,115 and No. 2,589,245. In addition, several of these resins are readily available commercial products. Typical polyhydroxy phenols useful in the preparation of epoxy resins include resorcinol and various diphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis(p-hydroxy phenyl) propane (Bisphenol A), the resin having the following structural formula:

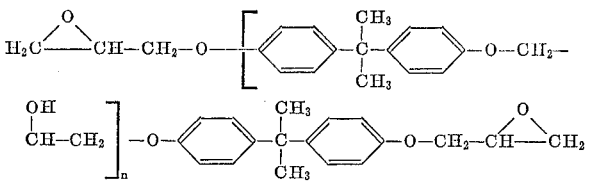

wherein $n$ is 0 or an integer up to 10. Generally speaking, $n$ will be no greater than 2 or 3 and is preferably 1 or less.

Included in this class of epoxy resins are the epoxylated novolacs. The epoxidized novolac resins have the hydroxyl groups replaced by glycidyl ether groups. An example of these resins is made and sold by the Dow Chemical Company under the trademark DEN 431. This resin has a functionality of 3.3 groups per molecule and has the following formula:

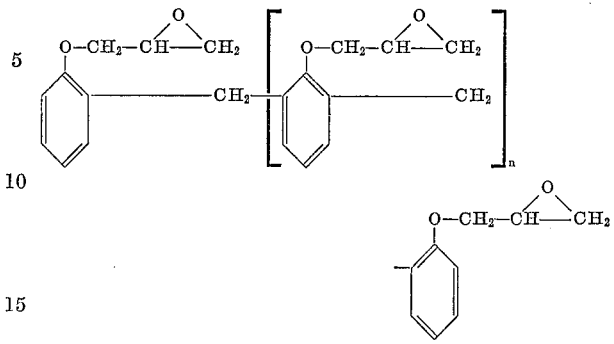

where the average value of $n$ is 1.3.

Another example of a commercially available epoxidized novolac is EPON 152 available from the Shell Chemical Company which is an epoxidized phenol-formaldehyde novolac having a functionality of 3.3 epoxy groups per molecule and a molecular weight of 590.

Other polyepoxides useful in the preparation of the unsaturated beta-hydroxy esters include cyclohexene dioxide, butadiene dioxide, epoxidized polybutadiene, copolymers containing glycol acrylates or methacrylates which are copolymerized through the alpha, beta-ethylenically unsaturated groups and having unreacted epoxide groups, and the epoxidized triglycerides.

Epoxidized triglycerides which may be used to prepare the unsaturated beta-hydroxy esters include oxirane containing fatty acid derivatives such as epoxidized linseed oil, epoxidized soya bean oil, epoxidized fish oils, or epoxidized perilla oil wherein the unsaturation present in the fatty acyl radical of the naturally occurring oil is substantially converted to oxirane groups providing a high oxirane triglyceride, i.e., epoxidized oils having at least 2 oxirane groups to more than 10 oxirane groups.

A preferred epoxidized triglyceride is epoxidized linseed oil. The epoxidized linseed oil may be represented as having the following formula:

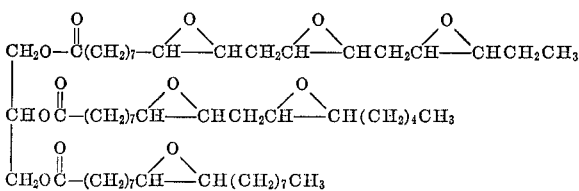

The epoxidized linseed oil is a highly reactive polyepoxide monomer containing on the average of 5.5 epoxy groups per molecule. Epoxidized linseed oil is obtainable commercially from Swift and Company under the trademark Epoxol 9–5. This epoxidized linseed oil has the following properties:

Equivalent weight/epoxy group—175 to 178
Molecular weight—980 approx.
Oxirane content—9% minimum
Iodine value—5 maximum
Gardner viscosity at 25° C.—880 cps.
Acid Number—0.3 maximum
Specific gravity—1.013 to 1.027

Additional examples of polyepoxides useful in this invention are the poly (epoxyalkyl) ethers which are the reaction products of ephihalohydrins with aliphatic polyhydric alcohols such as butanediol, glycerol, pentaerythritol, sorbitol, trimethylol propane, erythritol, arabitol, mannitol, dulcitol, ethylene glycol, polypropylene glycol, propylene glycol, and the like.

Illustrative examples of furan compounds which are used as stabilizing agents for beta-hydroxy esters in the practice of the present invention include furan, furfural, furfuryl alcohol and alkylated derivatives thereof having an alkyl group containing 1 to 6 carbon atoms such as 2-methylfuran, 3-methylfuran, 2,5-dimethylfuran, 5-methylfurfural (methylfurfurole), 5 - methylfurfuryl alcohol (5-methyl-2-furancarbinol) and the like.

The amount of furan compound to be admixed with the beta-hydroxy esters to prepare the stabilized compositions of the present invention may be varied within limits to obtain the particular degree of stabilization desired. Based on the amount of beta-hydroxy ester employed, it is generally advantageous to employ from about 5 to about 20 percent by weight of the furan compound and preferably about 10 to 15% by weight. The compositions of the present invention are generally comprised of about 80 to about 95% by weight of the beta-hydroxy ester and about 5 to about 20% by weight of the furan compound.

In coating substrates such as metal or paper in accordance with the process of the present invention, the admixture of polymerizable beta-hydroxy ester and furan compound is applied to a substrate in liquid form in any convenient manner, as by spraying, dipping, roll coating, and the like. As the beta-hydroxy ester/furan compound composition may not always be of a viscosity suitable for application by the above methods, it can be heated immediately prior to application to reduce viscosity.

In coating metal surfaces in accordance with the process of the present invention, a thin film of the admixture of unsaturated beta-hydroxy ester and furan compound is applied on the metal substrate which is generally in the form of a sheet and which is positioned to travel on a conveyor and pass under a source of ionizing radiation.

The unsaturated beta-hydroxy ester/furan compound composition for use in coating applications may also contain fillers, pigments, dyes and the like provided that these materials do not affect or prevent the polymerization of the ester contained in these mixtures or the stabilization of the ester effected by the furan compound.

The preferred coating weight for coating metal sheet substrates with an adequately protective coating composition comprised of the beta-hydroxy ester/furan compound admixture suitable for use in container manufacture is in the range of 1.0 to 15.0 milligrams of polymerized coating per square inch of substrate surface. To obtain these coating weights, the admixture is applied at a coating thickness of about 0.15 to about 1.0 mil, which thickness is adequate to permit penetration by the ionizing radiation to effect the polymerization.

The beta-hydroxy ester/furan compositions are clear liquids which after exposure to ionizing radiation remain essentially clear.

To effect the polymerization of the beta-hydroxy ester/furan compound composition, a film of the admixture is irradiated with a source of ionizing radiation, such as ultraviolet light or a beam of high energy electrons.

The source of ultraviolet light is suitably emitted from an artificial source or lamp having a wavelength in the range between 4000 A. and 1800 A., the irradiation source being of an intensity of at least 100 watts/in. of lamp surface. An exposure time to the ultraviolet source of about 1 to 30 seconds is required to effect polymerization of the beta-hydroxy ester/furan compound film.

Low pressure mercury vapor discharge tubes in quartz are the preferred source of ultraviolet light. Low pressure mercury vapor discharge tubes in glass and high pressure mercury vapor discharge tubes in quartz or glass may be employed is desired.

Irradiation with ultraviolet light of a wavelength below 3000 A. is preferred. When the beta-hydroxy ester/furan compound film composition is irradiated with ultraviolet light of a wavelength below 3000 A., the intensity of the irradiation should be between about 100 to about 1800 watts/in. of lamp surface for an exposure time of about 1 to 30 seconds. Generally, the source of irradiation is positioned ¼ to 1½ inches from the beta-hydroxy ester/furan film surface.

As regards any particular conditions of source and distance, the duration of the irradiation treatment can be determined by a few trials.

High energy electrons used to effect the polymerization of the beta-hydroxy ester/furan compound composition are obtainable from beams of high energy electrons produced by high voltage electron accelerators. There are several well-known types of electron accelerators available for this purpose. For example, the Van de Graaff electrostatic accelerator, resonant transformers, transformer-rectifiers, impulse of capacitrons, microwave waveguide linear accelerators, betratrons, and synchrotrons. The Van de Graaff type generator and the transformer-rectifiers produce electron beams in continuous streams, while the other generators mentioned produce the beams in pulses. The electrons in the beams produced by any of these generators ordinarily possess energy exceeding 100,000 electrons volts. The Van de Graaff electrostatic accelerator is operated at 300–500 kilovolts at 8–100 milliamperes.

The dosage of the irradiation produced by these electron beam is measured in terms of the quantity of energy absorbed by the material irradiated. The "rad" is the unit of absorbed dose. In radiation dosimetry, a megarad is defined as a dose of irradiation producing an energy absorption of 100 million ergs per gram of absorbent material irradiated.

In order to effect polymerization of the beta-hydroxy ester/furan compound composition by irradiation with high energy electrons in accordance with the process of the present invention, a dosage level within the range of about 0.1 megarad to about 10.0 megarads has been found to be satisfactory. The particular dosage level required in each case is dependent upon the thickness and the density of the particular unsaturated beta-hydroxy ester/furan compound composition being irradiated.

The electron beam polymerization of the beta-hydroxy ester is inhibited by the presence of air, and therefore, it is preferred to exclude air from the reaction zone and perform the irradiation in a vacuum or in an inert atmosphere such as nitrogen.

The irradiated beta-hydroxy ester/furan compound compositions of the present invention coated on metal plate are infusible coatings having high resistance to solvents, steam and foodstuff components and are tolerant to severe distortion by bending of the metal substrate. Metal plate coated with the polymerized ester compositions can be fabricated with bending or drawing to form container bodies and ends.

The present invention is illustrated, but not limited, by the following examples:

Example 1.—An unsaturated beta-hydroxy ester prepared from epoxidized linseed oil and acrylic acid was reacted in accordance with the following procedure:

To a one liter round-bottom flask, equipped with a condenser, stirrer, thermometer, and nitrogen inlet tube was charged the following reactants:

Epoxidized linseed oil (EPOXOL 9–5)—356 grams
Glacial acrylic acid—148 grams
Lithium hydroxide—2.5
Benzoquinone—0.8 gram
Methylethyl ketone—200 mls.

The temperature of the reaction mixture was raised to 105° C. and the mixture was refluxed for 6.5 hours under nitrogen atmosphere. Titration of a sample with a 0.2 N alcoholic KOH solution at this time indicated that about 65% of the epoxy groups had reacted with the acrylic acid. Furfuryl alcohol was added to a cooled solution of the epoxidized linseed oil/acrylic acid ester to prepare compositions containing 80 to 95% by weight of the ester and 5 to 20% by weight of the furfural alcohol. The resultant products were clear pale oils. The furfuryl alcohol-epoxidized linseed oil/acrylic acid ester mixtures were then treated with 0.7 gram of zinc dust for 1–2 hours to convert the benzoquinone to hydroquinone. The hydroquinone and unreacted acrylic acid was removed from the furfuryl alcohol-epoxidized linseed oil/acrylic acid ester mixture solutions through a basic ion exchange column. The methyl ethyl ketone was stripped under vacuum.

The furfural alcohol-epoxidized linseed oil/acrylic acid ester compositions were tested for stability to gel formation by placing the compositions in a closed 16 x 150 mm. test tube at room temperature containing a bubble of air of approximately the same diameter as the test tube and then recording the time interval at which gel formation was first observed. The failure of the air bubble to rise through the composition when the test tube was inverted was the criterion for gel formation. The results of this gel stability test are summarized in Table I below.

For purposes of comparison, in a separate series of tests, a number of compounds related to furfural alcohol as well as known stabilizer compounds were incorporated in the beta-hydroxy ester of Example 1 and these comparison compositions were also tested for gel stability. The results of these comparative tests designated by the symbol C are also summarized in Table I.

TABLE I

| Test No. | Stabilizer added to beta-hydroxy ester | Amount of stabilizer added (percent) | Days at room temp. to gel. |
| --- | --- | --- | --- |
| 1 | Furfuryl alcohol | 5 | 44 |
| 2 | do | 10 | 1 182+ |
| 3 | do | 20 | 1 182+ |
| 4 | Furan | 10 | 93 |
| C$_1$ | None | None | 6 |
| C$_2$ | Ethanol | 10 | 5 |
| C$_3$ | Dioxane | 10 | 8 |
| C$_4$ | Methyl ethyl ketone | 10 | 7 |
| C$_5$ | Nitromethane | 10 | 15 |
| C$_2$ | p-Methoxy phenol | (²) | 6 |

¹ No gel formation after 182 days at room temperature, test still in progress.
² 20 parts per million.

A 0.5 mil thick film of the beta-hydroxy ester/furfuryl alcohol composition of test No. 2 was applied to a 5 x 3 inch steel plate. The coated plate was placed on a continuously moving conveyor whose speed could be adjusted so as to control the time of the irradiation under a stationary, 1200-watt, ultraviolet lamp (General Electric Co. Hanovia LL Cat. No. 189A) which had an intensity of 100 watts/in. of lamp surface. The conveyor was adjusted so that the coated plate traveled 0.75 inch under the surface of the ultraviolet lamp. The time required to form a tack-free coating was 15 seconds. The unstabilized beta-hydroxy ester composition of test No. C$_1$ which contained no stabilizer applied to a steel plate in the above manner also required 15 seconds of ultraviolet irradiation to form a tack-free coating on the plate, indicating that the furfural alcohol had appreciably increased the gel stability of the ester, namely more than 182 days vs. 6 days, without effecting the sensitivity of the ester to polymerization with ionizing radiation.

Similarly a 0.5 mil thick film of the beta-hydroxy ester/furfuryl alcohol composition of test No. 2 applied to a steel plate when irradiated in a nitrogen atmosphere with a 1.04 megarad dose of an electron beam at 300 thousand electron volts cured to a tack-free coating. A film of the unstabilized beta-hydroxy ester composition C$_1$ when applied to a steel plate in a similar manner required a 0.99 megarad dose of the same electron beam to be cured to a tack-free coating.

Example 2.—The procedure of Example 1 was repeated in an additional series of tests with the exception that 10% by weight furfural was used to stabilize the beta-hydroxy ester coating compositions.

As in Example 1, comparative tests were conducted using 10 percent by weight concentrations of a variety of closely related compound. The stability of the compositions as well as the radiation dosages required to cure the coating the tack-free films is recorded in Tables II and III below. The comparative tests are designated by the symbol C.

TABLE II.—IRRADIATION REQUIRED TO OBTAIN TACK FREE FILM

| Test No. | Stabilizer added to beta-hydroxy ester | Days at room temp. to gel | Ultraviolet light (seconds) | Electron beam (megarads) |
| --- | --- | --- | --- | --- |
| 5 | Furfural | ¹ 148+ | 15 | 1.00 |
| C$_7$ | Benzene | 14 | | |
| C$_8$ | Toluene | 17 | | |
| C$_9$ | Xylene | 14 | 15 | 2.25 |
| C$_{10}$ | Anisole | 14 | | |
| C$_{11}$ | Biphenyl | 35 | | |
| C$_{12}$ | Naphthalene | 28 | 15 | 2.25 |
| C$_{13}$ | Dichlorobenzene | 17 | | |
| C$_{14}$ | Maleic anhydride | 10 | 15 | 2.25 |
| C$_{15}$ | Styrene | 13 | | |
| C$_{16}$ | Benzyl alcohol | 54 | 15 | 2.25 |
| C$_{17}$ | Acetic acid | 6 | 15 | 2.25 |
| C$_{18}$ | Indene | 13 | | |
| C$_{19}$ | Mesitylene | 35 | 15 | 2.25 |
| C$_{20}$ | Pyrene | 47 | >30 | ² 4.8 |
| C$_{21}$ | Pyrrole ³ | 75 | 15 | 2.13 |
| C$_{22}$ | None | 14 | 15 | 2.25 |

¹ No gel formation after 148 days, test still in progress.
² Tacky.
³ Radiation cured film exhibited very poor solvent resistance and poor adhesion to metal.

TABLE III.—IRRADIATION REQUIRED TO OBTAIN TACK-FREE FILM

| Test No. | Stabilizer added to beta-hydroxy ester | Days at room temp. to gel | Ultraviolet light (seconds) | Electron beam (megarads) |
| --- | --- | --- | --- | --- |
| 6 | Furfural alcohol | ¹ 109+ | 15 | 2.25 |
| C$_{23}$ | Furoic acid | 19 | ² 30 | ² 4.07 |
| C$_{24}$ | Ethylvinylether | 10 | 15 | 1.04 |
| C$_{25}$ | Isobutylvinylether | 7 | 15 | 1.04 |
| C$_{26}$ | None | 7 | 15 | 1.97 |

¹ Test still in progress.
² Tacky.

What is claimed is:

1. A composition having improved stability to gel formation which remains susceptible to polymerization by ionizing radiation comprised of a major amount of ethylenically unsaturated ester having a hydroxyl group beta to the ester linkage prepared by the reaction of a polyepoxide having at least 2 epoxide groups in the polyepoxide molecule with an alpha, beta-unsaturated monocarboxylic acid having 3 to 7 carbon atoms and an effective minor amount of a furan compound having the formula

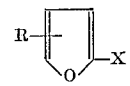

wherein R is an alkyl group having 1 to 6 carbon atoms and X is selected from the group of radicals consisting of H, CH$_2$OH, CHO, and CH$_2$OCH$_3$.

2. The composition of claim 1 wherein the polyepoxide is an epoxidized linseed oil.

3. The composition of claim 1 wherein the acid is acrylic acid.

4. The composition of claim 1 wherein the furan compound is furan.

5. The composition of claim 1 wherein the furan compound is furfuryl alcohol.

6. The composition of claim 1 wherein the furan compound is furfural.

7. The composition of claim 1 containing about 80 to about 95% by weight of the ethylenically unsaturated ester and about 5 to about 20% by weight of the furan compound.

8. A process for coating an article comprising the steps of:
applying to the surface of the article to be coated a thin film of a composition comprised of a major amount of an ethylenically unsaturated ester having a hydroxyl group beta to the ester linkage prepared by the reaction of a polyepoxide having at least 2 epoxide groups in the polyepoxide molecule with an alpha, beta-unsaturated monocarboxylic acid having 3 to 7 carbon atoms and an effective minor amount of a furan compound having the formula

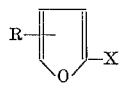

wherein R is an alkyl group having 1 to 6 carbon atoms and X is selected from the group of radicals consisting of H, $CH_2OH$, CHO and $CH_2OCH_3$, and exposing the film containing surface to a source of ionizing radiation for a time sufficient to effect polymerization of the film to obtain the coated article.

9. The process of claim 8 wherein the film is polymerized with a source of ultraviolet light.

10. The process of claim 8 wherein the film is polymerized with a beam of high energy electrons.

11. The process of claim 8 wherein the polyepoxide is an epoxidized linseed oil.

12. The process of claim 8 wherein the acid is acrylic acid.

13. The process of claim 8 wherein the furan compound is furan.

14. The process of claim 8 wherein the furan compound is furfural alcohol.

15. The process of claim 8 wherein the composition contains about 80 to about 95% by weight of the ester and about 5 to about 20% by weight of the furan compound.

References Cited

UNITED STATES PATENTS

| | | | |
|---|---|---|---|
| 3,445,421 | 5/1969 | Singh | 260—45.8O |
| 3,432,478 | 3/1969 | May | 260—837 |
| 3,408,422 | 10/1968 | May | 260—837 |
| 3,033,720 | 5/1962 | Siegrist | 260—45.8O |
| 2,993,915 | 7/1961 | Lusuin | 260—45.8O |
| 2,993,913 | 7/1961 | Dunlop | 260—45.8O |

MURRAY TILLMAN, Primary Examiner

R. B. TURER, Assistant Examiner

U.S. Cl. X.R.

117—93.31, 132BE, 155UA; 204—159.14; 260—2EP, 23EP, 45.8O, 47EP, 59, 829, 836, 837R